(12) United States Patent
Tanio

(10) Patent No.: US 8,015,903 B2
(45) Date of Patent: Sep. 13, 2011

(54) METHOD FOR CUTTING BRAKING SURFACE OF WHEEL BEARING DEVICE EQUIPPED WITH BRAKE ROTOR

(75) Inventor: Masayuki Tanio, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 753 days.

(21) Appl. No.: 11/883,890

(22) PCT Filed: Aug. 26, 2005

(86) PCT No.: PCT/JP2005/015556
§ 371 (c)(1),
(2), (4) Date: Oct. 18, 2007

(87) PCT Pub. No.: WO2006/087838
PCT Pub. Date: Aug. 24, 2006

(65) Prior Publication Data
US 2008/0134847 A1    Jun. 12, 2008

(30) Foreign Application Priority Data

Feb. 21, 2005 (JP) ................. 2005-044003

(51) Int. Cl.
*B23B 5/04* (2006.01)
(52) U.S. Cl. ............... 82/112; 82/104; 82/158
(58) Field of Classification Search .......... 2/1.11, 2/104, 105, 112, 123, 152; 82/1.11, 104, 82/105, 112, 123, 152; 29/894.362, 557, 29/402.19
See application file for complete search history.

(56) References Cited

U.S. PATENT DOCUMENTS
3,540,165 A * 11/1970 Lanham ............... 451/398
(Continued)

FOREIGN PATENT DOCUMENTS
EP    1752242 A2 *  2/2007
(Continued)

OTHER PUBLICATIONS

English translation of JP 2007-045305A, Inventor: Morita et al., Feb. 2007, Japan, pp. 1-8.*

*Primary Examiner* — Boyer D Ashley
*Assistant Examiner* — Sara Addisu
(74) *Attorney, Agent, or Firm* — Wenderoth, Lind & Ponack, L.L.P.

(57) ABSTRACT

In cutting the braking surface of a brake rotor-equipped wheel bearing device, which includes an outer member having a car body attaching flange in the outer periphery, an inner member having a wheel attaching flange in the outer periphery, a plurality of rows of rolling bodies incorporated between the two members and rotatably supporting the inner member, and a brake rotor attached to the wheel attaching flange, the cutting is performed such that subsequently to assembling the wheel bearing device in its mounted state, the end surface of a wheel pilot formed in the inner member is finish-cut. The brake rotor is then attached to the wheel attaching flange, whereupon the braking surface of the brake rotor is cut with the outer diameter of the wheel pilot gripped relative to the end surface of the wheel pilot.

4 Claims, 4 Drawing Sheets

U.S. PATENT DOCUMENTS

| | | | |
|---|---|---|---|
| 5,842,388 A * | 12/1998 | Visser et al. | 82/1.11 |
| 5,884,980 A * | 3/1999 | Visser et al. | 301/6.1 |
| 5,937,499 A * | 8/1999 | Austin et al. | 29/434 |
| 6,158,124 A * | 12/2000 | Austin | 29/898.09 |
| 6,247,219 B1 | 6/2001 | Austin et al. | |
| 6,415,508 B1 * | 7/2002 | Laps | 29/894.362 |
| 6,579,156 B2 * | 6/2003 | Sugino et al. | 451/52 |
| 6,619,163 B2 * | 9/2003 | Tanio et al. | 82/112 |
| 6,796,029 B2 * | 9/2004 | Mazur et al. | 29/894.361 |
| 6,829,825 B1 * | 12/2004 | Bowman et al. | 29/894.32 |
| 7,305,765 B2 * | 12/2007 | Mitsue et al. | 29/894.362 |
| 2002/0066185 A1 * | 6/2002 | Loustanau et al. | 29/898.06 |
| 2004/0123707 A1 * | 7/2004 | Kroener et al. | 82/1.11 |
| 2006/0110087 A1 * | 5/2006 | Igari et al. | 384/544 |
| 2007/0033787 A1 * | 2/2007 | Shibata et al. | 29/233 |

FOREIGN PATENT DOCUMENTS

| | | |
|---|---|---|
| JP | 11-019803 | 1/1999 |
| JP | 11182538 A * | 7/1999 |
| JP | 2000-356233 | 12/2000 |
| JP | 2002337502 A * | 11/2002 |
| JP | 2003-240029 | 8/2003 |
| JP | 2003240029 A * | 8/2003 |
| JP | 2004-299666 | 10/2004 |
| JP | 2007045305 A * | 2/2007 |
| JP | 2007045306 A * | 2/2007 |
| JP | 2007046685 A * | 2/2007 |
| JP | 2007046686 A * | 2/2007 |
| WO | WO 2004035326 A1 * | 4/2004 |
| WO | WO 2004067296 A1 * | 8/2004 |

* cited by examiner

METHOD FOR CUTTING BRAKING SURFACE OF WHEEL BEARING DEVICE EQUIPPED WITH BRAKE ROTOR

TECHNICAL FIELD

This invention relates to a method for cutting the braking surface of a brake rotor attached to the flange of a wheel bearing device.

BACKGROUND ART

Wheel bearing devices for automobiles generally are due of two types: One for driving wheels and the other for non-driving wheels. In wheel bearing devices, the planar runout of the braking surface occurring during the rotation of the brake rotor causes brake judder during the brake application, and hence high cutting accuracy and high dimensional accuracy are required in the individual parts of the wheel bearing device. Even if the cutting accuracy in individual parts is enhanced, however, not only do the cutting errors in the individual parts accumulate during the assembling of the wheel bearing device, but also assembling errors occur, so that the planar runout of the braking surface of the brake rotor cannot be suppressed.

To eliminate such drawbacks, there have already been proposed methods for cutting the braking surface, the methods comprising mounting on a cutting machine a brake rotor-equipped wheel bearing device assembled in its mounted state and rotating the brake rotor with the brake rotor-equipped wheel bearing device supported in its mounted state (Japanese Unexamined Patent Publication H11-19803, Japanese Unexamined Patent Publication 2000-356233, and U.S. Pat. Nos. 6,158,124 and 6,247,219.

According to the cutting methods, since the braking surface of the brake rotor is cut with the brake rotor-equipped wheel bearing device held in its mounted state, accumulative errors in the form of accumulative cutting errors in the individual parts, and strains produced during the fixing of the brake rotor are eliminated by cutting. Consequently, assembling the brake rotor-equipped wheel bearing device having undergone cutting, to an actual car results in the brake rotor-equipped wheel bearing device being restored to its state of having undergone cutting, the planar runout of the braking surface occurring during the rotation of the brake rotor being very little, enabling the brake rotor to rotate with extremely high accuracy.

Conventional cutting methods for cutting the braking surface of the brake rotor with a brake rotor-equipped wheel bearing device held in its mounted state are cutting methods which are intended to suppress the planar runout of the braking surface occurring during the rotation of the brake rotor and to prevent vibrations from occurring during the brake application, and which are so arranged that, of inner and outer members relatively rotating through rolling bodies, the inner member is fixed, in which state the braking surface of the brake rotor assembled to the inner member is cut; thus, the rolling body contact surfaces are deformed during the cutting load application, which deformation causes deflections in the bearing rotation axis and cutting axis, resulting in the planar runout accuracy being degraded by an amount corresponding to the deflections.

SUMMARY OF THE INVENTION

An object of the invention is to provide a method for cutting the braking surface of a brake rotor-equipped wheel bearing device more highly accurately and efficiently.

A method for cutting the braking surface of a brake rotor-equipped wheel bearing device according to the invention comprises an outer member having a car body attaching flange in the outer periphery, an inner member having a wheel attaching flange in the outer periphery, a plurality of rows of rolling bodies incorporated between the two members and rotatably supporting the inner member, and a brake rotor attached to the wheel attaching flange, the method further comprising a first process in which subsequently to assembling the wheel bearing device in its mounted state, the end surface of a wheel pilot formed in the inner member is finish-cut, and a second process in which the brake rotor is then attached to the wheel attaching flange, whereupon the braking surface of the brake rotor is cut with the wheel pilot outer diameter gripped relative to the end surface of the wheel pilot.

The first process comprises, for example, the following steps.

a. Assembling the wheel bearing device in its state prior to having the brake rotor attached thereto.

b. Using a chuck device to nonrotatably support the outer member in such a manner that the car body attaching surface of the car body attaching flange is used as a reference surface, and the reference surface is positioned.

c. Inserting a spline shaft in a spline hole in a hub ring, and threadedly engaging a nut with the threaded portion of the front end thereof to tighten it with a pressing force corresponding to the tightening force associated with the mounted state.

d. With the pressing state held as it is, rotating the spline shaft, thereby imparting torque to the inner member to rotate the latter around the axis of the wheel bearing device, cutting the end surface of the wheel pilot while providing a feed to a cutting tool.

The second process comprises, for example, the following steps.

e. Attaching the brake rotor to the wheel attaching flange of the wheel bearing device having undergone the first process, thus completing the brake rotor-equipped wheel bearing device.

f. Gripping the outer periphery of the wheel pilot by the chuck device relative to the end surface of the wheel pilot.

g. Rotating the inner member to cut the braking surface of the brake rotor while providing a feed to the cutting tool.

Performing the finish cutting of the end surface of the wheel pilot of the hub ring after the assembling of the wheel bearing device suppresses the axial runout of the end surface of the wheel pilot irrespective of the dimensional errors or assembling errors in the individual parts. Next, the braking surface of the brake rotor is cut by attaching the brake rotor to the wheel bearing device and gripping the outer diameter of the wheel pilot relative to the end surface of the wheel pilot; thus, highly accurate cutting is made possible while suppressing the planar runout of the braking surface of the brake rotor, without binding the outer member.

Therefore, according to the invention, since the rotation runout of the braking surface of the brake rotor can be minimized, it is possible to improve the rotation accuracy of the bake rotor in the mounted state and suppress occurrence of brake judder during the brake application.

DETAILED DESCRIPTION OF THE INVENTION

First, before describing a cutting method, a brake rotor-equipped wheel shaft bearing device, which is a subject of cutting, will be described.

Figure 3:
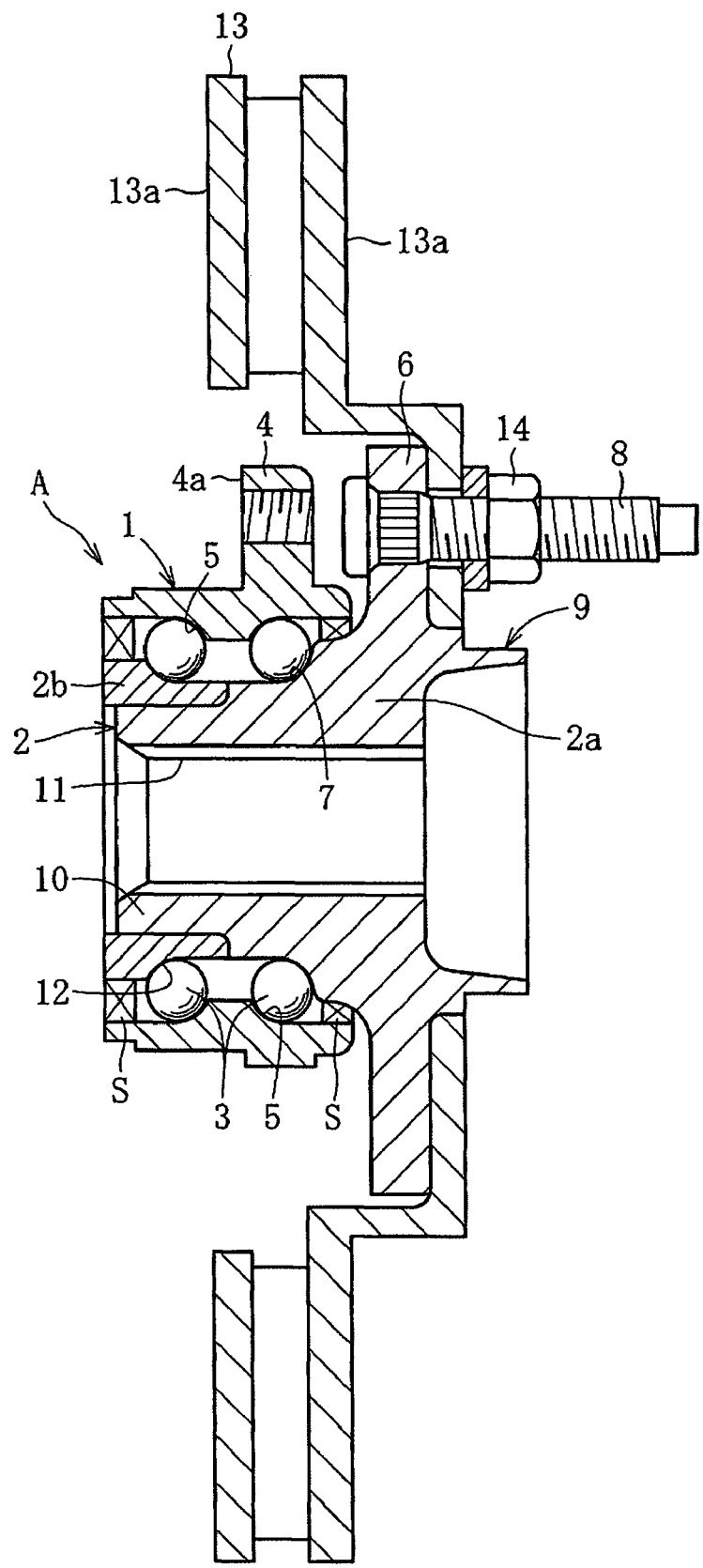
FIG. 3 is a longitudinal sectional view of a brake rotor-equipped wheel bearing device for driving wheels.

FIG. 3 shows an example of a brake rotor-equipped wheel bearing device for driving wheels. This brake rotor-equipped wheel bearing device A comprises an outer member 1 corresponding to a bearing outer ring, an inner member 2 corresponding to a bearing inner ring, and rolling bodies 3 interposed between the two members 1 and 2.

The outer member 1 is provided with a flange in the outer periphery for attaching the outer member to a car body, i.e., a car body attaching flange 4, and is formed with two raceways 5 in the inner periphery.

The inner member 2 consists of a hub ring 2a and a bearing ring 2b The hub ring 2a has a wheel pilot 9 formed in the end on the outboard side appearing on the right-hand side of FIG. 3, and a small diameter section 10 formed in the end on the inboard side or the opposite side. A spline hole 11 extends through the hub ring 2a from the bottom surface of the wheel pilot 9 to the end surface on the inboard side. The outer periphery of the outboard end of the hub ring 2a is provided with a flange for attaching a wheel, i.e., a wheel attaching flange 6. The wheel attaching flange 6 has a plurality of hub bolts 8 attached thereto. The intermediate outer periphery of the hub ring 2a is formed with a raceway 7.

The bearing ring 2b is fitted on the small diameter section 10 of the hub ring 2a. The outer periphery of the bearing ring 2b is formed with a raceway 12. The raceway 7 of the hub ring 2a and the raceway 12 of the bearing ring 2b correspond to the two raceways 5. Rollably disposed between the raceways 5 of the outer member 1 and the raceways 7 and 12 of the inner member 2 (the hub ring 2a and bearing ring 2b) are two rows of rolling bodies 3, supporting the outer and inner members 1 and 2 for relative rotation.

Seals S are mounted at the opposite ends between the opposed surfaces of the outer and inner members 1 and 2. The seals S prevent foreign matter from entering the bearing and also prevent grease filled in the bearing from leaking.

In the thus-arranged wheel bearing device, when it is to be assembled to an actual car, the car body attaching flange 4 of the outer member 3 is attached to the car body by bolting. Further, the spline shaft 16 provided in the outer joint member of a constant velocity joint is inserted in the spline hole 11 in the hub ring 2a. Then, a nut 17 is threadedly engaged on a threaded shaft formed at the front end of the spline shaft and tightened with standard torque, so as to axially press the hub ring 2a and bearing ring 2b, thereby imparting a preload to the bearing. Further, the brake rotor 13 and a wheel (not shown) are attached to the hub bolt 8 provided on the wheel attaching flange 6, and a wheel nut 14 is tightened.

Next, the method for cutting the braking surface 13a of the brake rotor 13 in the brake rotor-equipped wheel bearing device A will be described. The cutting method in this embodiment comprises a first process and a second process.

Figure 1:
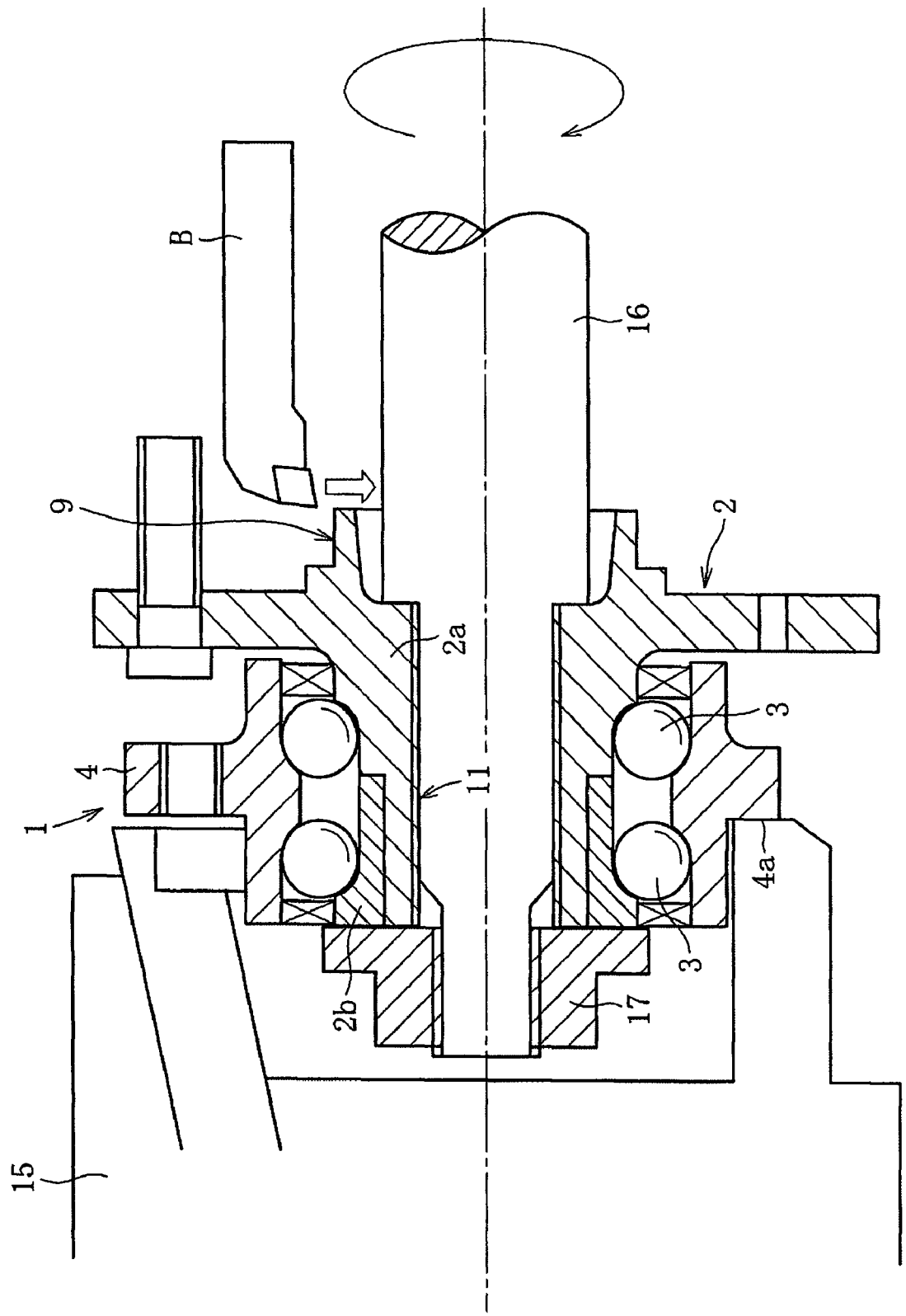
FIG. 1 is a longitudinal sectional view for explaining a first process of the cutting method of the invention.

The first process is as shown in FIG. 1. It comprises assembling the wheel bearing device in its mounted state before the brake rotor is attached thereto, and using the chuck device 15 to nonrotatably support the outer member by positioning a reference surface provided by the attaching surface 4a of the car body attaching flange 4 with respect to the car body. And, this is followed by inserting the spline shaft 16 in the spline hole 11 in the hub ring 2a, and threadedly engaging the nut 17 on the threaded section at the front end to tighten the nut with a pressing force corresponding to the tightening force associated with the mounted state.

With the pressing state held as it is, rotating the spline shaft 16, thereby imparting torque to the inner member 2 to cause the latter to rotate around the rotation axis of the wheel bearing device, cutting the end surface of the wheel pilot 9 while feeding a cutting tool B as indicated by a white arrow. This cutting makes it possible to sufficiently reduce the axial runout of the end surface of the wheel pilot 9 during the rotation of the wheel bearing device irrespective of the dimensional errors or assembling errors in the individual parts.

Figure 2:
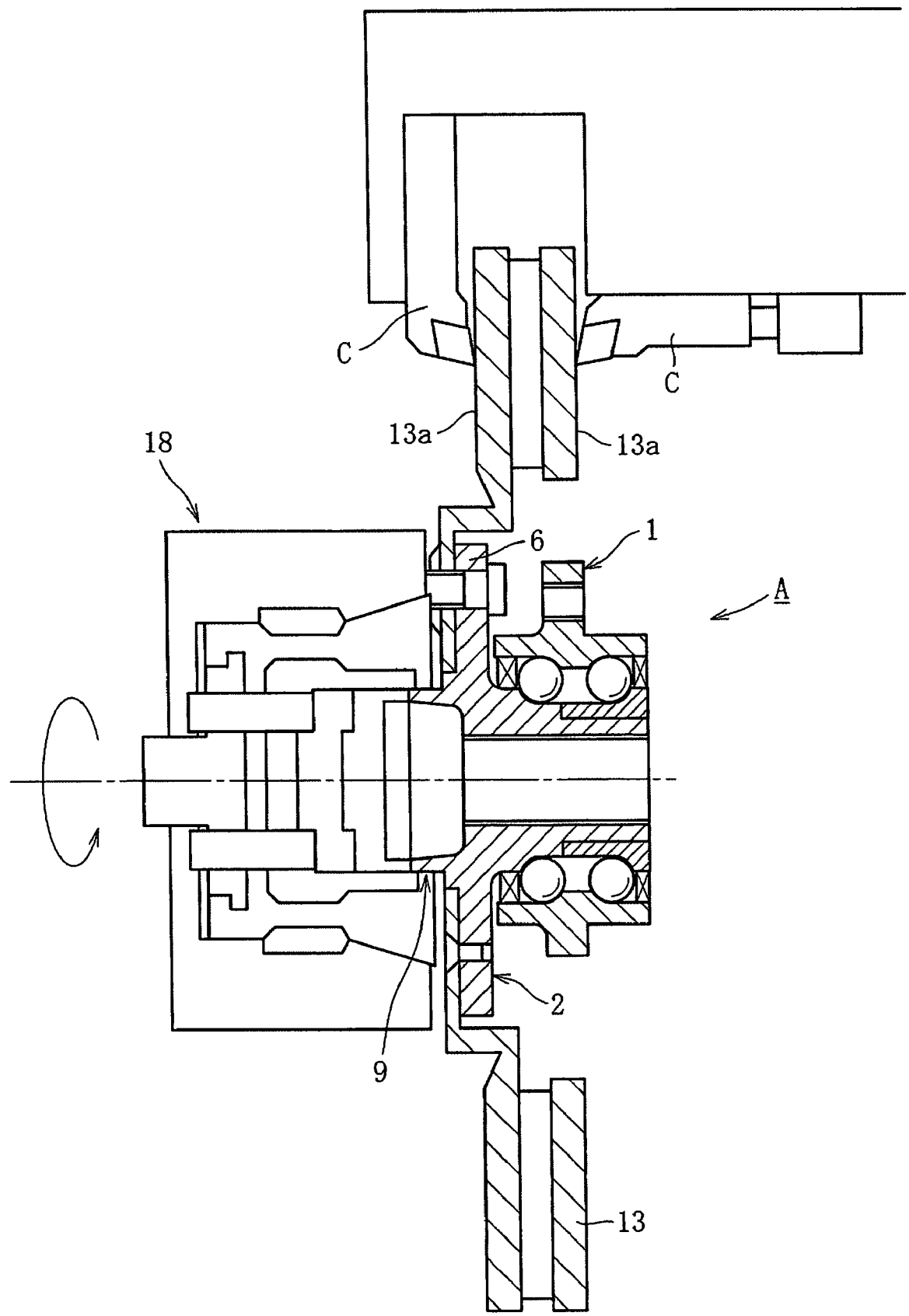
FIG. 2 is a longitudinal sectional view for explaining a second process of the cutting method of the invention.

The second process is as shown in FIG. 2. It comprises attaching the brake rotor 13 to the wheel attaching flange 6 of the wheel bearing device having undergone the first process. Then, the thus-arranged brake rotor-equipped wheel bearing device A is gripped by using the chuck device 18, which grips the outer periphery of the wheel pilot 9, relative to the end surface of the wheel pilot 9. In this state, the inner member 2 is rotated to cut the braking surface 13a of the brake rotor 13 while feeding a cutting tool C.

According to the cutting method in this embodiment, the first process makes it possible to secure the end surface of the wheel pilot 9 while extremely improving the axial planar runout accuracy with respect to the rotation of the wheel bearing device, and the second process, on the basis of this result, cuts the braking surface 13a of the brake rotor 13; therefore, the axial planar runout of the braking surface 13a of the brake rotor 13 with respect to the rotation of the wheel bearing device can be minimized.

Further, strains produced when the brake rotor 13 is fixed to the wheel attaching flange 6 are also removed. Further, in the conventional system, since the braking surface 13a of the brake rotor 13 is cut with the outer member 1 fixed, the rolling body contact surfaces are deformed under the cutting load, which deformation causes deflections in the bearing rotation axis and cutting axis, resulting in a phenomenon in which the planar runout accuracy correspondingly degrades. In contrast, the cutting method in this embodiment does not bind the outer member 1 when cutting the braking surface 13a of the brake rotor 13; therefore, deflections hardly occur in the bearing rotation axis and cutting axis, so that correspondingly high accuracy cutting is possible.

Figure 4:
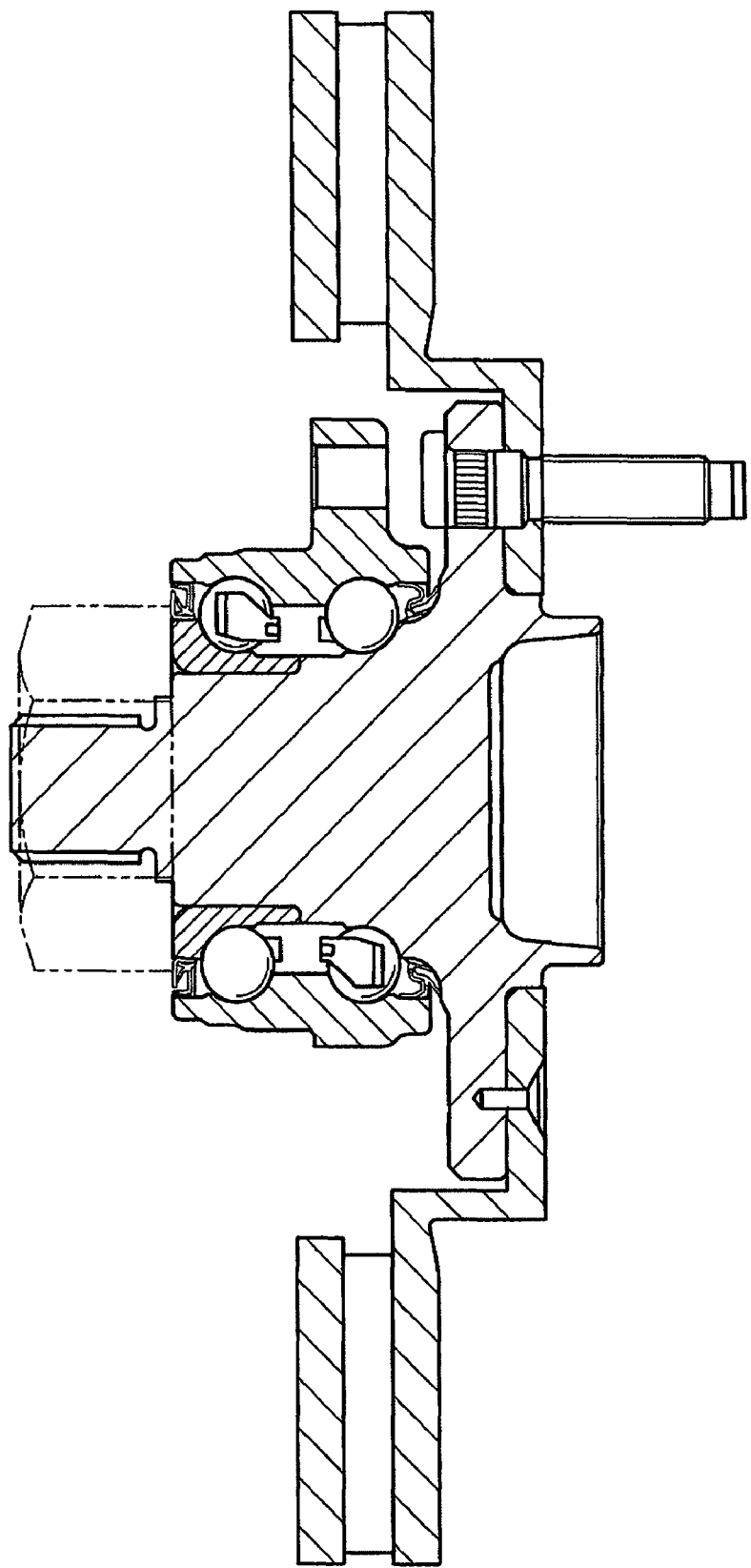
FIG. 4 is a longitudinal sectional view of a brake rotor-equipped wheel bearing device for non-driving wheels.

Although a wheel bearing device has been described by citing, as an example, one used for driving wheels which has the spline hole 11 in the inner member 2 (hub ring 2a), the wheel bearing device may be one used for non-driving wheels, as shown in FIG. 4.

The invention claimed is:

1. A method for cutting the braking surface of a brake rotor-equipped wheel bearing device, the brake rotor-equipped wheel bearing device comprising an outer member having a car body attaching flange at the outer periphery, an inner member having a wheel attaching flange at the outer periphery, a plurality of rows of rolling bodies between said inner and outer members and rotatably supporting the inner member, and a brake rotor attached to said wheel attaching flange, said method comprising assembling the wheel bearing device so as to be mounted to a car body via the car body attaching flange at the outer periphery of the outer member and via inserting a spline shaft in a spline hole in a hub ring and threadedly engaging a nut with a threaded portion of the front end of the spline shaft, subsequently to assembling the wheel bearing device, finish-cutting the end surface of a wheel pilot formed in the inner member, and attaching the brake rotor to the wheel attaching flange, whereupon the braking surface of the brake rotor is cut with the wheel pilot outer diameter gripped relative to the end surface of the wheel pilot.

2. A method as set forth in claim 1, wherein:

said assembling the wheel bearing device occurs prior to attaching the brake rotor to the wheel attaching flange, and said method further comprising using a chuck device to nonrotatably support the outer member in such a manner that a car body attaching surface of the car body attaching flange is used as a reference surface, and said reference surface is positioned is a predetermined position, tightening the nut with a pressing force corresponding to a tightening force associated with mounting the wheel bearing device to the car body, and with the pressing force held substantially constant, rotating the spline shaft, thereby imparting torque to the inner member to rotate the inner member around the axis of the wheel bearing device, cutting the end surface of the wheel pilot while providing a feed to a cutting tool.

3. A method as set forth in claim 2, wherein:

said attaching the brake rotor to the wheel attaching flange of the wheel bearing device completes the brake rotor-equipped wheel bearing device, and said method further comprising gripping the outer periphery of the wheel pilot by the chuck device relative to the end surface of the wheel pilot, and rotating the inner member to cut the braking surface of the brake rotor while providing a feed to the cutting tool.

4. A method as set forth in claim 1, wherein:

said attaching the brake rotor to the wheel attaching flange of the wheel bearing device completes the brake rotor-equipped wheel bearing device, and said method further comprising gripping the outer periphery of the wheel pilot by a chuck device relative to the end surface of the wheel pilot, and rotating the inner member to cut the braking surface of the brake rotor while providing a feed to a cutting tool.

* * * * *